United States Patent
Gul et al.

(10) Patent No.: US 9,792,892 B2
(45) Date of Patent: Oct. 17, 2017

(54) NOISE CANCELLATION SYSTEM

(71) Applicants: Hassan Faqir Gul, New Windsor (NZ); Nigel Greig, Pt. Chevalier (NZ); Thomas Allen Darbonne, Santa Cruz, CA (US); Mark Poletti, Alicetown (NZ); Johann Frederic de Guigne, Remuera (NZ)

(72) Inventors: Hassan Faqir Gul, New Windsor (NZ); Nigel Greig, Pt. Chevalier (NZ); Thomas Allen Darbonne, Santa Cruz, CA (US); Mark Poletti, Alicetown (NZ); Johann Frederic de Guigne, Remuera (NZ)

(73) Assignee: Amphenol Phitek Limited, Auckland (NZ)

(*) Notice: Subject to any disclaimer, the term of this patent is extended or adjusted under 35 U.S.C. 154(b) by 0 days.

(21) Appl. No.: 14/800,308

(22) Filed: Jul. 15, 2015

(65) Prior Publication Data

US 2016/0027428 A1 Jan. 28, 2016

(30) Foreign Application Priority Data

Jul. 15, 2014 (NZ) ........................ 627508

(51) Int. Cl.
*H04R 27/00* (2006.01)
*G10K 11/178* (2006.01)
(Continued)

(52) U.S. Cl.
CPC ........ *G10K 11/1788* (2013.01); *G10K 11/178* (2013.01); *H04R 27/00* (2013.01);
(Continued)

(58) Field of Classification Search
CPC ............. G10K 11/1788; G10K 11/178; G10K 2210/108; G10K 2210/3221;
(Continued)

(56) References Cited

U.S. PATENT DOCUMENTS 2,043,416 A 6/1936 Lueg
5,138,664 A 8/1992 Kimura et al.
(Continued)

FOREIGN PATENT DOCUMENTS

EP 0852792 7/1998
EP 2725575 A1 4/2014
WO 2013143971 10/2013

OTHER PUBLICATIONS

Cohn D. Kestell, Ben S. Cazzolato and Colin H. Hansen. "Active Noise Control in a Free Field with Virtual Sensors," J. Acoustical Society of America 109. pp. 232-243, Jan. 31, 2001.
(Continued)

*Primary Examiner* — Muhammad N Edun
(74) *Attorney, Agent, or Firm* — Jackson Walker LLP

(57) ABSTRACT

Active noise cancellation may be provided by a variety of systems, methods and techniques. General aspects, for example, include an active noise cancellation system, a controller for an active noise cancellation system, and/or a method of generating an anti-noise signal. In one example aspect, an active noise cancellation system for an aircraft In-flight entertainment system may include at least one input device, a processing means, and an output. The input device may be associated with a seat on the aircraft and adapted to receive an input representative of an ambient noise in the vicinity of the seat. The processing means may be adapted to process the input to produce an output signal adapted to reduce the ambient noise in volume associated with the seat. The output may be adapted to transmit an output signal to at least one driver, which is adapted to transmit the output signal to a user.

19 Claims, 10 Drawing Sheets

3A

3B

(51) Int. Cl.
H04R 5/02 (2006.01)
H04R 5/027 (2006.01)
H04R 1/10 (2006.01)

(52) U.S. Cl.
CPC .............. *G10K 2210/108* (2013.01); *G10K 2210/1281* (2013.01); *G10K 2210/3221* (2013.01); *H04R 1/1083* (2013.01); *H04R 5/023* (2013.01); *H04R 5/027* (2013.01); *H04R 2227/001* (2013.01); *H04R 2410/05* (2013.01); *H04R 2499/13* (2013.01)

(58) Field of Classification Search
CPC ............ G10K 2210/1281; H04R 27/00; H04R 2499/13; H04R 1/1083; H04R 2227/001; H04R 5/023; H04R 2410/05; H04R 5/027
See application file for complete search history.

(56) References Cited

U.S. PATENT DOCUMENTS

| | | | |
|---|---|---|---|
| 5,481,615 A | 1/1996 | Eatwell et al. | |
| 5,987,144 A | 11/1999 | Carme et al. | |
| 6,061,456 A | 5/2000 | Andrea et al. | |
| 6,343,127 B1 | 1/2002 | Billoud | |
| 2001/0031052 A1* | 10/2001 | Lock | H04R 5/023 381/71.7 |
| 2010/0142718 A1 | 6/2010 | Chin et al. | |
| 2011/0002474 A1 | 1/2011 | Fuller | |
| 2011/0222699 A1* | 9/2011 | Maeda | G10K 11/178 381/71.4 |
| 2013/0120124 A1* | 5/2013 | Lancaster | G08B 3/10 340/384.1 |
| 2014/0270220 A1 | 9/2014 | Bieler | |

OTHER PUBLICATIONS

A. Brancati and M.H. Aliabadi. "Boundary element simulations for local active noise control using an extended volume." Engineering Analysis with Boundary Elements. pp. 190-202, Oct. 6, 2011.

Wen-Kung Tseng, "Local active noise control using a novel method of designing quiet zones." Control Engineering Practice. pp. 1450-1458, Sep. 16, 2011.

Debi Prasad Das, Danielle J. Moreau and Ben Cazzolato. "Performance evaluation of an active headrest using the remote microphone technique," Proceedings of Acoustics, Paper 69, pp. 1-8, Nov. 2, 2011.

European Search Report Re Application No. EP 15 17 6936, dated Aug. 10, 2015.

\* cited by examiner 3A  3B

NOISE CANCELLATION SYSTEM

TECHNICAL FIELD

The present invention relates to an active noise cancellation system which uses a microphone which is detached from a user of the system, and in particular, but not exclusively, to such a system which is configured for use in a passenger vehicle such as an aircraft.

BACKGROUND TO THE INVENTION

Many aircraft, including most aircraft on long haul and international routes, provide an inflight entertainment (IFE) system. Such systems provide a combination of audio and video entertainment. Modern IFE systems provide passengers with a variety of audio and visual media options, for example, music channels, games, movies, and television programmes. Users can be provided with audio or video-on-demand, meaning that each individual user may select an audio track or audio channel, or an audio-visual programme that they wish to listen to, or watch, at any given time. This is usually achieved by each passenger seat in an aircraft environment having its own visual display unit (usually in the form of an LCD display) and an appropriate jack for receiving the plug for a headset which delivers the audio content to the user. The VDU may be connected to a server directly or through an intermediary device such as a seat electronics box.

Audio from the IFE system is typically delivered to a user through a headset (the terms "headset" and "headphone" are used interchangeable herein). However, the noise generated by the aircraft can be distracting or annoying for the user. Jet engined aircraft tend to generate low frequency noise in and around the 150-200 Hz range. The need to minimise the cost of the headsets precludes the use of dense sound insulating materials which would be required to attenuate noise in this frequency range to any significant degree.

A well-known method of reducing the level of ambient noise apparent to a headset wearer is the technique known as active noise cancellation or active noise reduction (ANR). Here, a microphone mounted to the headset detects the ambient noise. Through suitable signal processing the headset's drivers are driven to produce an inverted (antiphase) version of the signal. The ambient noise and the inverted signal cancel each other, and the user experiences a decrease in the ambient noise level, particularly at low frequencies.

While headphones with integrated active noise cancellation hardware work well, they may be prohibitively expensive to issue to passengers.

Other headphones have sensing microphones which supply a signal to active noise cancellation circuitry provided in the seat i.e. the noise cancellation circuitry is not included in the headset. This reduces the cost of the headset, but even these headsets may be prohibitively expensive to issue to passengers.

The reference to any prior art in this specification is not, and should not be taken as, an acknowledgement or any form of suggestion that the prior art forms part of the common general knowledge in any country.

BRIEF SUMMARY

In a general aspect, the disclosure provides an active noise cancellation system, a controller for an active noise cancellation system and/or a method of generating an active noise cancellation anti-noise signal which will overcome or ameliorate problems with active noise cancellation systems at present, or which will at least provide the public with a useful choice.

Objects of the invention may become apparent from the following description, which is given by way of example only.

In a one aspect the invention may be said to broadly consist in an active noise cancellation system for an aircraft In-flight entertainment system, the active noise cancellation system including:

At least one input device, associated with a seat on the aircraft, to receive an input representative of an ambient noise in the vicinity of the seat;

Processing means adapted to process the input to produce an output signal adapted to reduce the ambient noise in volume associated with the seat;

An output for transmitting an output signal to at least one driver, the driver adapted to transmit the output signal to a user, and Wherein the output signal is adapted so that, in use, the user hears a reduced ambient noise when seated in the seat.

Preferably at least one driver is associated with a headset and/or at least one driver or at least one input device is associated with the seat.

Preferably in use a position of the user may change, and wherein the user hears a reduced ambient noise in a plurality of positions.

In certain implementations, the system includes a plurality of input devices, which may be spatially separated in a substantially planar arrangement. The plurality of input devices may, for example, be separated around a driver. At least some of the plurality of input devices may be associated with a passenger seat.

In particular implementations, the output comprises a jack adapted to form a connection with an audio device.

In some implementations, the input means is adapted to receive an input from a plurality of input devices.

In some implementations, the output means is adapted to transmit an output to a plurality of output devices. At least one of the plurality of output devices may be associated with a passenger seat.

At least one driver or at least one input device may be attached or attachable to an arm or arms of a seat headrest, wherein the angle of the diver or microphone is acute with respect to a user of the seat.

Preferably the passenger seat or headrest has at least one arm and the at least one of the plurality of the input and/or output devices is associated with the arm of the headrest.

In particular implementations, the plurality of input and/or output devices are substantially arranged in a row and at least one of the of the plurality of input and/or output devices is forward of another of the devices.

At least some of the plurality of input and/or output devices may be arranged to span the head of a user.

In some implementations, each of the plurality of input devices is associated with an output device. In certain implementations, each of the plurality of input devices is associated with a plurality or all of the output devices.

Preferably each of the plurality of input devices is associated with at least one output device and the input and output devices are at least partially aligned.

In particular implementations, the system comprises a output device detector to determine a characteristic of the output device.

In some implementations, at least one of the plurality of output devices is associated with a set of headphones.

Preferably at least one of the plurality of output devices is a driver in a set of headphones.

In certain implementations, a plurality of the input devices are arranged in a group. Preferably the group forms a polygonal arrangement, wherein each of the input devices is at a vertex of the polygon. In particular implementations, an output device is positioned at substantially the centre of the group.

Preferably the active noise cancellation system is associated with an IFE system.

The input device may, for example, be a microphone. The driver may, for example, be a speaker.

Preferably the ANC is an analogue system.

In a second aspect the invention may be said to broadly consist in an active noise cancellation system comprising:
  An input means adapted to receive an input from an input device;
  Processing means adapted to process the input to produce an output adapted to reduce the noise apparent at the input;
  An output means and adapted to transmit an output to at least one driver separated from the input device, and
  Wherein the active noise cancellation is adapted to allow a change in the separation of the input and output means and there is a reduction in noise apparent at the driver.

Preferably the adaption a plurality of spatially separated input device allows a change in separation of the input device and the output means.

Some implementations include a plurality of input devices that are spatially separated in a geometrical arrangement. Preferably the input devices are substantially in a plane.

Preferably a second output device is associated with the input device/s.

In a third aspect, the invention may be said to broadly consist in a method of active noise cancellation in an In-Flight Entertainment system, the method comprising:
  Receiving an input from an input device associated with the In-Flight Entertainment system;
  Processing the input to produce an output signal adapted to reduce the ambient noise in a volume associated with the seat;
  Outputting an output signal to at least one driver, the driver adapted to transmit the output signal to a user, and
  Wherein the output signal is adapted so that, in use, the user hears a reduced ambient noise when seated in the seat.

In some implementations, the driver is attachable to a user, and the input device is attached to an object. The object may be a seat or part of an IFE system.

Preferably the spatially separation is by attachment to separate objects.

Preferably the spatial separation is variable.

Preferably the method includes the step of varying the separation wherein the output continues to receive a reduced noise.

In a further aspect the invention may be said to broadly consist in an active noise cancellation system for an In-flight entertainment system comprising:
  An input means adapted to receive an input from an input device associated with a seat associated with the IFE system;
  Processing means adapted to process the input to produce an output adapted to reduce the noise apparent at the input;
  An output means and adapted to transmit an output to at least one driver separated from the input device, and
  Wherein the active noise cancellation is adapted so that, in use, a user of the In-flight entertainment system hears a reduced apparent noise when seated in the seat.

In some implementations, the driver is in a headset worn by the user. The driver may be connected to the IFE system by wired or wireless means.

In particular implementations, there are a plurality of drivers.

In a further aspect the invention may be said to broadly consist in an active noise cancellation system adapted for a seated user, the system comprising:
  An input means adapted to receive an input from an input device associated with the seat;
  Processing means adapted to process the input to produce an output adapted to reduce the noise apparent at the input;
  An output means adapted to transmit an output to at least one driver, the driver adapted to provide the output to the user; and
  Wherein there is a reduction in noise apparent to the user.

In a further aspect the invention may be said to broadly consist in an active noise cancellation system adapted for a seat for a user, the system comprising:
  An input means adapted to receive an input from an input device associated with the seat;
  Processing means adapted to process the input to produce an output adapted to reduce the noise apparent at the input;
  An output means adapted to transmit an output to at least one driver, the driver adapted to provide the output to the user; and
  Wherein there is a reduction in noise apparent to the user when the user is sat on the seat.

In particular implementations, the input device is attached, or attachable to the seat. The input device may be attached, or attachable, to a headrest of the seat. Preferably the input device is a removable attachment for the seat. Preferably the input device and driver are attached to a removable attachment for the seat.

In particular implementations, the reduction in noise is apparent for the user when a separation between the user and the seat changes.

In some implementations, there are a plurality of input devices associated with the seat. The input devices may be spatially separated to reduce the noise apparent to the user when the space between the user and the seat changes.

In certain implementations, the driver is worn by the user. Preferably the driver is worn as a headset. The driver may also be attached, or attachable to, the seat.

In some implementations, a plurality of drivers are associated with the seat. Preferably at least one driver is attached or attachable to the seat and at least one driver is attachable to the user.

In another aspect the invention may be said to broadly consist in a seat portion for an active noise cancellation system, the seat portion comprising:
  An input device for receiving an input;
  An driver means associated with the input device and adapted to transmit an output adapted to reduce the noise apparent at the input.

In some implementations, the output is adapted to allow a change in the separation of the input and output means.

Preferably the seat portion is unitary with, a part of, attached to or attachable to a seat.

In certain implementations, the seat is associated with a processing means, the processing means adapted to receive the input and generate an anti-noise signal for transmitting to the output.

In some implementations, the input device comprises a plurality of microphones. The plurality of microphones may surround or encircle a driver means.

Preferably the seat portion comprises a connection means to an IFE system.

Preferably the seat portion can transmit and/or receive communication from the IFE system. Preferably the output can be transmitted to a driver of a headset.

According to one aspect of the present invention there is provided an active noise cancellation system controller comprising:
  first input means for receiving an ambient noise signal from at least one sensing microphone;
  second input means for receiving a signal from a measuring means which is representative of a distance between a reference point and a head of a user, wherein the reference point is substantially stationary relative to the at least one sensing microphone;
  processing means for receiving the signals from the first and second input means and generating an anti-noise signal which will destructively interfere with the ambient noise detected by the sensing microphone; and
  output means for transmitting the anti-noise signal to at least one driver;
  wherein the processing means varies a property of the antinoise signal in response to changes in the signal from the measuring means.

Preferably the property comprises one or more of a phase amplitude, or audio spectrum content so of the antinoise signal.

Preferably the controller comprises an input for receiving an audio signal, wherein the controller superimposes the audio signal with the anti-noise signal and transmits the combined signal to the output.

Preferably the audio signal is generated by an in-flight entertainment (IFE) system.

Preferably the driver forms part of a headset.

Preferably the controller comprises means for adjusting at least one property of the anti-noise signal dependent on at least one characteristic of the at least one driver and/or the headset.

Preferably the controller comprises an input means for receiving a signal which is indicative of the at least one characteristic.

Preferably the controller adjusts one or more of a phase, amplitude, or audio spectrum content of the anti-noise signal in response to a signal received by the second input means and/or a signal received by the third input means.

According to a further aspect of the present invention there is provided a seat for a passenger vehicle, the seat comprising at least one sensing microphone operable to sense noise and provide a sensed noise signal to an active noise cancellation system controller.

Preferably the seat comprises at least two microphones, wherein at least one microphone is provided on each side of the seat.

Preferably the active noise cancellation system controller comprises the controller of the first aspect.

According to a further aspect of the present invention there is provided an active noise cancellation system comprising:
  a seat comprising at least one sensing microphone for receiving ambient noise;
  a measuring means for measuring or estimating a distance between a user's head and a reference point, wherein the reference point is substantially fixed with respect to the sensing microphone;
  processing means for receiving signals from the sensing microphone and the measuring means and generating an anti-noise signal which will destructively interfere with the ambient noise detected by the sensing microphone; and
  output means for transmission of the anti-noise signal to at least one driver;
  wherein the processing means varies a property of the antinoise signal in response to changes in the signal from the measuring means.

Preferably the property is the phase/timing/delay of the antinoise signal.

In some implementations, the sensing microphone is positioned at or adjacent a headrest or upper portion of the seat, and the reference point is at or adjacent the headrest or upper portion of the seat.

The processing means may receive an audio signal, wherein the processing means superimposes the audio signal with the anti-noise signal and transmits the combined signal to the output.

Preferably the audio signal is generated by an in-flight entertainment (IFE) system.

The driver may form part of a headset. The processing means may adjust at least one property of the anti-noise signal dependent on at least one characteristic of the at least one driver and/or the headset.

Preferably the processing means receives a signal which is indicative of the at least one characteristic. More preferably the processing means receives the signal from the headset.

Preferably the processing means uses the distance between the user's head and the reference point and/or the at least one characteristic as a variable in determining at least one of a required phase, amplitude, or audio spectrum content of the anti-noise signal.

Preferably the measuring means comprises one of an infra-red proximity sensor or an ultra-sonic proximity sensor. Alternatively the measuring means comprises a camera.

According to an additional aspect of the present invention, there is provided a method of creating an active noise cancellation anti-noise signal comprising:
  receiving an ambient noise signal at a first location;
  dynamically measuring or estimating a distance between the first location and a second location in which a noise cancellation effect is required;
  generating an anti-noise signal; and
  outputting the anti-noise signal;
  the method further comprising adjusting a property of the anti-noise signal in response to changes in the distance between the first and second locations such that the anti-noise signal is suitable to produce a noise cancellation effect at the second location.

Preferably the property is the phase/timing/delay of the antinoise signal.

According to a further aspect of the present invention, there is provided a seat for a passenger vehicle comprising at least one sensing microphone, at least one output jack, and connecting means for connecting the at least one microphone and the output jack to an active noise cancellation system controller.

Preferably the controller comprises the controller of the first aspect.

Preferably the seat further comprises a measuring means for measuring or estimating a distance between a user's head and a reference point, wherein the reference point is substantially fixed with respect to the sensing microphone.

In a further aspect, the invention broadly provides a noise cancellation system comprising:
an input means for receiving a noise signal from a sensing microphone associated with a vehicle passenger seat;
an output means for providing an anti-noise signal to a passenger headset;
a processing means to process the noise signal to provide the anti-noise signal based a location of the headset in use.

In one embodiment, the location of the headset is estimated based on a user's likely head position in the seat.

In another embodiment, the location is determined or estimated by measurement.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

According to a still further aspect of the present invention, an active noise cancellation system and/or a controller for such a system is substantially as herein described, with reference to the accompanying drawings.

Further aspects of the invention, which should be considered in all its novel aspects, will become apparent from the following description given by way of example of possible embodiments of the invention.

DESCRIPTION OF EXAMPLE EMBODIMENTS OF THE INVENTION

Figure 1:
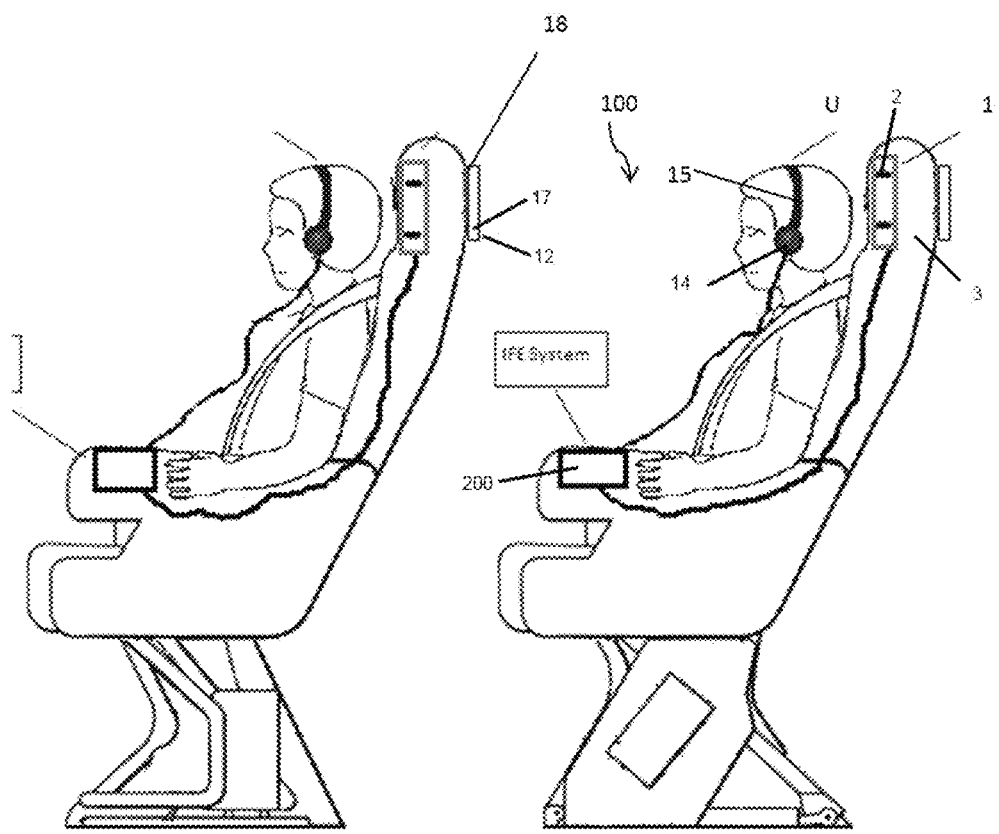
FIG. 1 Is a diagrammatic side view of an example active noise control system of the present invention installed in an aircraft passenger seat.
Figure 2:
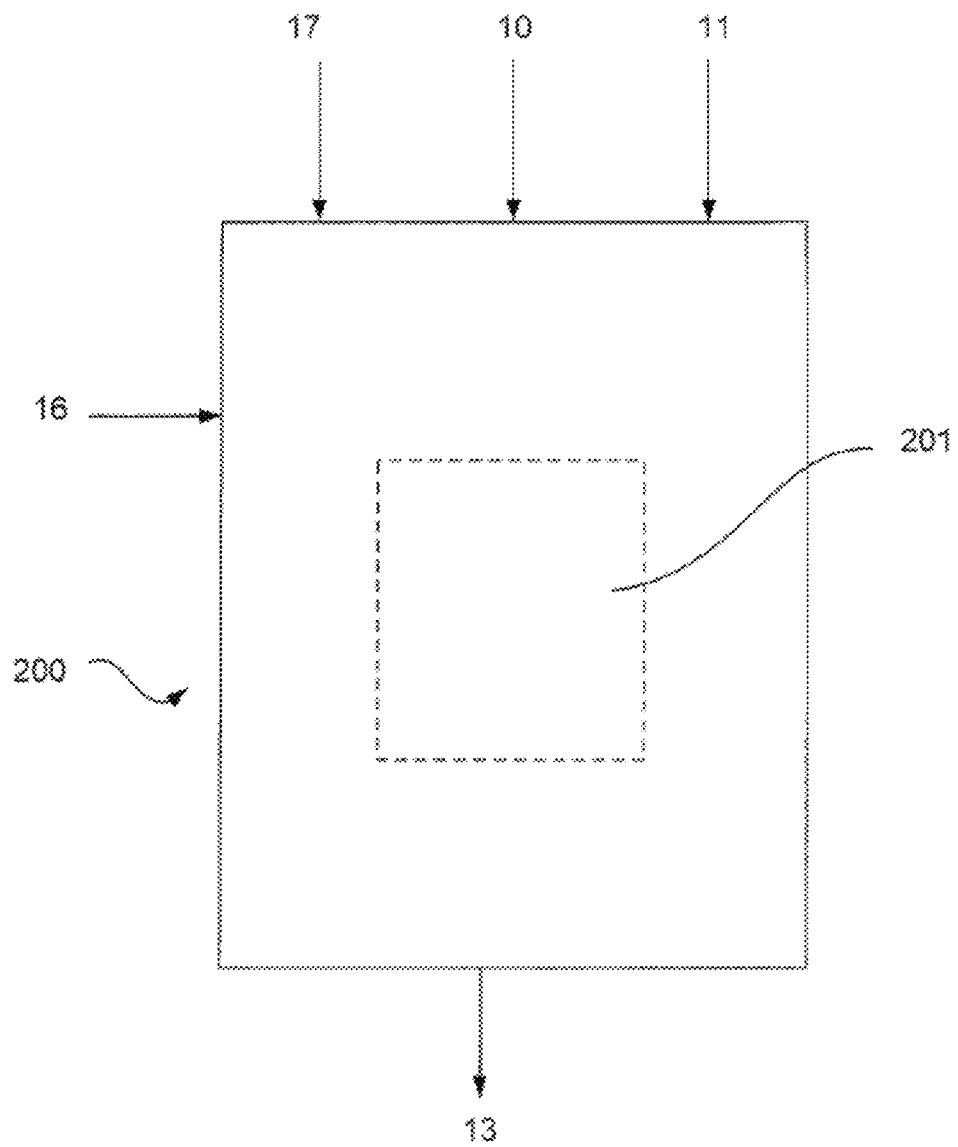
FIG. 2 is a schematic view of an example controller for an active noise control system of the present invention.

Referring first to FIGS. 1 and 2, an example active noise cancellation system according to an embodiment of the present invention is generally referenced by arrow 100.

The system 100 comprises a seat 1 which is provided with at least one sensing microphone 2. The sensing microphone 2 is located on or in the seat, preferably at or adjacent the headrest 3 or upper portion of the back of the seat 1. The or each sensing microphone 2 is preferably positioned so as to be in the vicinity of the ears of an average user U of the system 100 when the user is seated in a normal position. In a preferred embodiment at least one microphone is provided on either side of the seat. The provision of two or more microphones allows a sound wave to be modelled in three dimensions, this allowing an improved model of the acoustic environment, so a more effective anti-noise signal can be generated.

Preferably, the input device, e.g. microphone, is substantially stationary but the noise cancellation produced by the system is adapted to reduce the ambient noise at a plurality of positions of a user, and in particular a user's head. That is the user's head will typically move in a spatial area of the seat and the noise cancellation should be adapted to reduce the sound in at least a portion of this area. The area (which represents a 3D volume) may include changes to the horizontal and vertical separation of the microphone and user and/or microphone and driver. For instance, the user may lean forward to retrieve an item and her head may increase in separation from the microphone/s location. The area associated with the seat is preferably a general area which has strong attenuation in a first area, the attenuation reducing as a user moves from the area. Preferably the area or volume includes a range of typical head positions.

A controller 200 is provided. The controller has a first input 10 for receiving a signal from the sensing microphone 2 which is representative of the ambient noise. A second input 11 may be provided for receiving a signal from a measuring means 12 which measures or estimates a distance between the head of the user U and a reference point R on the seat. The reference point R is preferably substantially fixed with respect to the one or more sensing microphones 2, and in some embodiments the reference point R may be coincident with one of the sensing microphones 2. Suitable measuring means 12 are described in more detail herein. In a preferred embodiment multiple microphones, or an array of, are used. Multiple microphones allow separation of the sound or ambient noise into various directions of arrival. This provides information about the sound field instead of a single sensor. In an embodiment microphones may be present in multiple locations around the user seat, for instance at the VDU and in the user seat.

The controller 200 is further provided with an output means 13 for sending a signal to at least one driver 14. The at least one driver 14 may form part of a standard headphone set 15 such as is routinely provided to aircraft passengers.

In particular embodiments, the controller 200 includes an IFE input means 16 for receiving an audio signal from the IFE system or directly from a user's portable device.

The controller 200 comprises a suitable processor 201 (which may be digital or analogue, or a combination of both) which generates an anti-noise signal which, when broadcast by the headphones, will destructively interfere with the sound wave detected by the sensing microphone(s) 2 when that sound wave reaches the user's ear. The anti-noise signal is superimposed on any audio signal received from the IFE input means 16 and sent to the output 13.

Figure 3:
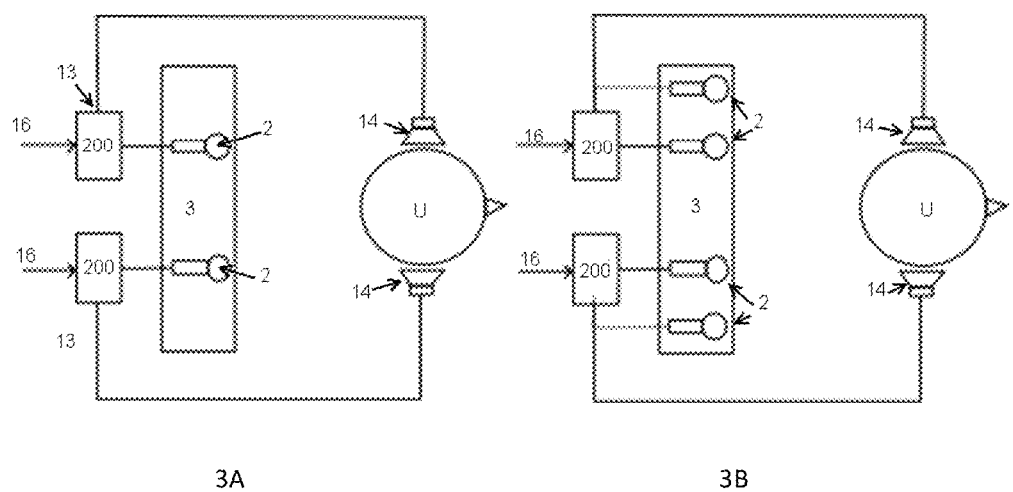
FIG. 3 is a schematic view of an example active noise control system of the present invention having (a) 2 and (b) 4 microphones.

FIG. 3*a* shows an example embodiment of the system. At least one, and preferably two, transducers 2, such as microphones, are positioned in a portion of the seat 1, preferably the headrest 3. At least one controller 200, including or associated with a processor 201, which may be two active noise cancellers, use the driver 14 or speaker 14 of the headphones to cancel the sound at the microphones 2. When the listener or user is close to the microphones 2 the sound at the ears will also be reduced. The reduction in sound is frequency dependent. In the case of aircraft reducing low frequencies (i.e. 150-200 Hz) is particularly important as this frequency is generated by the engines.

FIG. 3*b* shows an example embodiment of the invention where 4 microphones and 2 drivers are used, the drivers supplied on a headset. Embodiments of the invention may have a plurality of microphones and drivers (which may equivalently be other suitable input or output means or connections) to improve cancellation or broaden the range of positions achieving audio cancellation. The two speaker, four microphone (2S4M) set up of FIG. 4 could similarly be arranged with the drivers present on the headrest 3 of the seat, or elsewhere in the aircraft or in association with the IFE system.

Figures 5A, 5B:
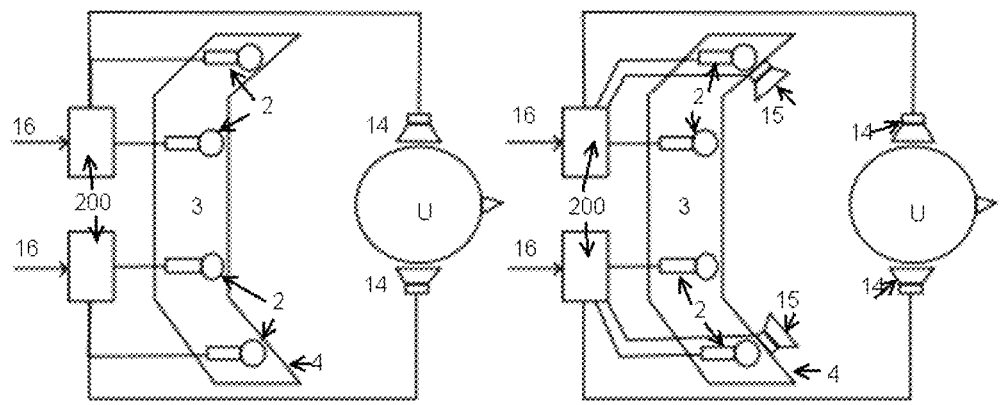
FIGS. 5A-5B are schematic views of example active noise control systems of the present invention where the arms of the headrest are used for (a) microphones and (b) microphones and speakers FIG. 6 (Prior Art) is a diagrammatic view of an ANC system.

FIG. 5*a* shows example 4 microphone 2 speaker (4M2S) and FIG. 5*b* shows an example 4 microphone 4 speaker (4S4M) arrangement. In embodiments of the invention, and as shown in FIG. 5*b* at least some of the microphones and speakers are positioned at a distance from the plane of the seat back. That is there is a difference in distance from user U. For example they may be associated with or connected to the sides or arms 4 of the headrest 3 which may be slightly forward of the back of the headrest. This offsets the microphones or drivers by a small distance, such as 20-100 mm forward of the origin (or position of the backmost microphone or speaker). FIG. 5*b* shows a system with speakers on both the headset and seat 1. In a further embodiment there may be no speakers on the user, e.g. no headset is used.

Some embodiments may allow reduction in the delay between headphones and the microphones, for instance placing microphones in the headrest wings may improve performance by reducing delay. In an embodiment having a single microphone per headphone driver delay may improve noise cancellation, although this is dependent on the headphones used and, in part the low frequency response. The use of microphones and/or drivers in the headrest wings also allows the radiation of sound out of the headphones to be more symmetric with microphones in the wings. Having the microphones or microphone array in the wings of the seat, or otherwise angled with respect to the seat, allows the microphone array to be directed towards the ear. This can be important because the ear is where the noise wants to be cancelled. Performance is based on both angle and location of the microphones and/or drivers. Preferably the microphones are angled within 90 degrees of the drivers, more preferably less than 45 degrees from the angle of the drivers and most preferably substantially at the angle, or the approximate angle, of the drivers. That is, there is a stronger relation between the headphone drivers and the microphones. In alternative embodiments the microphones may be in the same plane as the back of the seat but may be rotated or substantially parallel with respect to the seat. Preferably the microphones are positioned away from the location of a user's head, so as to avoid blockage or dampening of any input signal.

Figure 4:
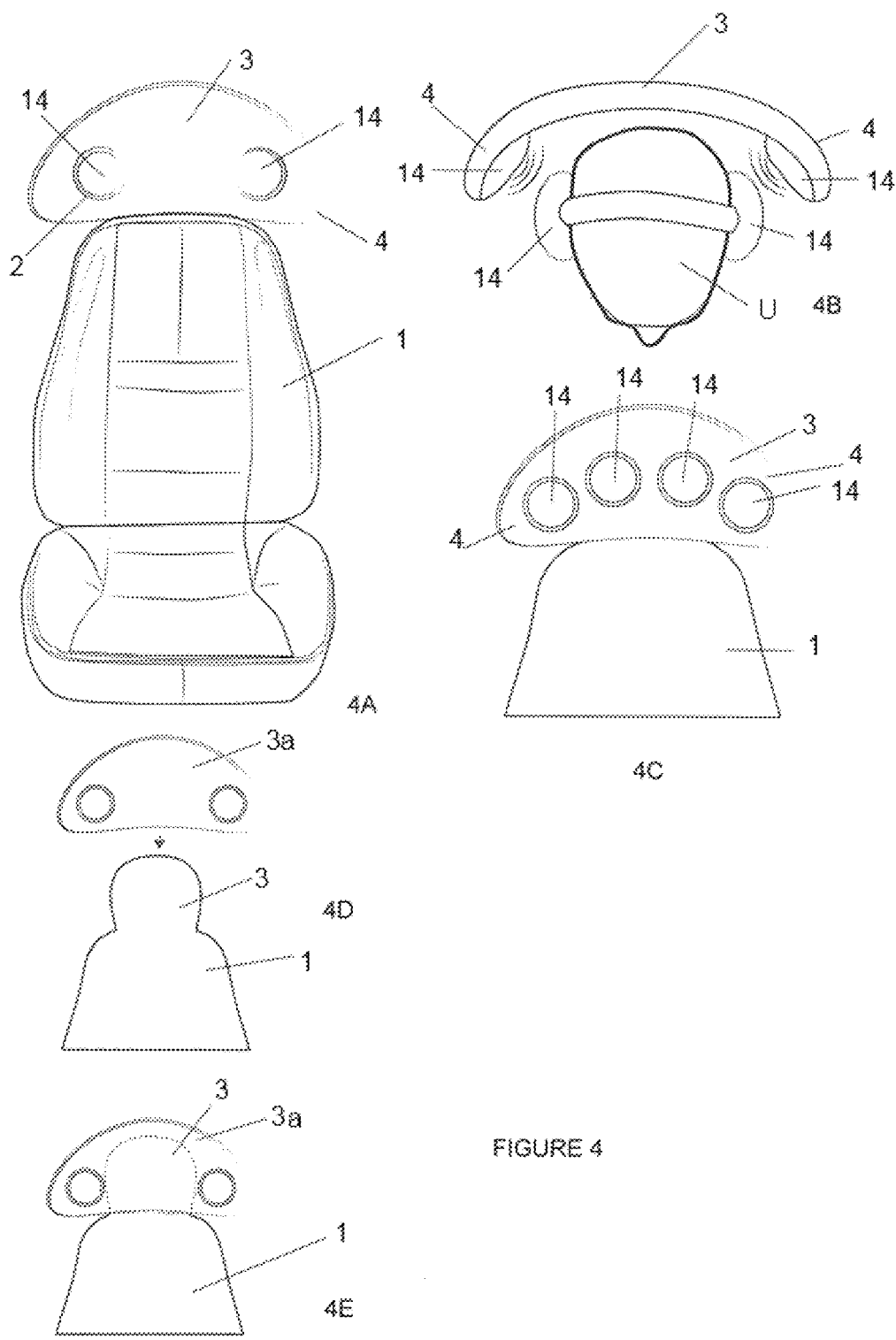
FIG. 4 is a schematic view of example arrangements of the seat, headrest and arms.

FIG. 4 shows a series of embodiments for the system having speakers 14 and/or transducers 2 arranged on a seat. Preferably they are on the head of the seat or headrest, or a part of the seat nearest the user's head. In some embodiments there may be speakers 2 at multiple levels to allow users of different heights. FIG. 4B shows the change in depth of the seat allowing arms or wings 4 to be closer to the User. In particular the arms 4 may be angled which enables the speakers 2 to be angled to match the headphones and/or ears of the user. FIG. 4*c* shows that multiple transducers 2 may be placed on the seat. In a further embodiment shown in FIGS. 4D and 4E the head of the seat or a part thereof may be removable 3*a*. This allows a quick change or replacement of the system connected to the seat. An embodiment may have the input and/or output means as an attachment to, or connected portion of the seat or headrest. In other embodiments the electronic components or input devices may be replaceable in portions of the seat, or may be unitary with the seat.

Figure 6:
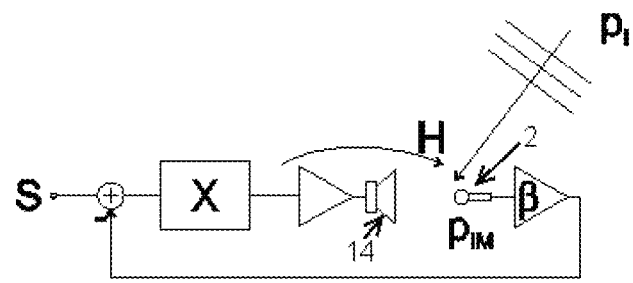

FIG. 6 shows a representation of an ANC system where a cancellation signal is obtained from a microphone 2 or similar input device. The controller X(w) aims to provide sufficient noise cancellation while maintaining stability of the feedback loop. Typically X(w) consists of a gain, g, in series with a loop filter, L(w), which aims to reduce the gain sufficiently to prevent the system going unstable at high frequencies. For the system of FIG. 6 a transfer function (STF) can be calculated to show the frequency dependence of attenuation:

$$STF = \frac{HX}{1 + \beta HX},$$

Where H is the transfer function of the amplifier and loudspeaker transfer functions plus the acoustic transfer function to the microphone, X is the signal and β represents the transduction factor from sound pressure to microphone output voltage. The pressure at the microphone is equal to the original sound pressure, plus a cancelling field generated by the loudspeaker which is in anti-phase to the incident field. For large loop gains the pressure is exactly cancelled. In practice the level of cancellation is limited by the risk of instability which is governed by the open-loop transfer function. For the reproduction of music at the microphone position, the STF is ideally flat.

Figure 7:
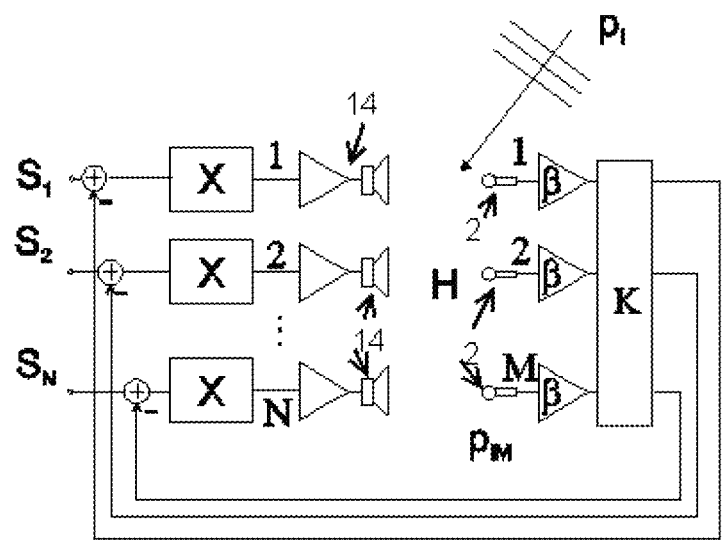
FIG. 7 (Prior Art) is a diagrammatic view of an ANC system with multiple channels.

FIG. 7 shows the system of FIG. 6 extended to multiple channels where some cross-coupling between the channels has been considered. The system assumes that there is a separate controller—each consisting of a gain, $g_n$, and loop filter L(w)—per channel however in alternative embodiments multiple channels may be combined or connected. If the number of loudspeakers and microphones differ there must be a relationship, for instance shown in a matrix K, which maps M microphone signals into N loudspeaker signals. For N=M, K may be the identity matrix. For M>N, and even numbers of transducers, the simplest approach is to sum two or more microphones to one speaker. However in some cases microphones may be combined in more complicated patterns, such as linking microphones on the same side of the seat.

In order for the anti-noise signal to effectively cancel the ambient noise, its phase (relative to the ambient noise signal) must be correct when it reaches the user's U ear. This is relatively easy to achieve if the user U has their head pressed against the seat 1 such that their ears are in close proximity to the microphone(s) 2. However, if the U user leans forward, such that the distance between the user's ears and the sensing microphone 2 is a significant proportion of the wavelength of the ambient noise, then the phase of the anti-noise signal may be incorrect, and the noise cancelling effect may be reduced. In extreme cases the anti-noise signal may constructively interfere with the ambient noise, causing an increase in the perceived background noise at some frequencies. This may be particularly problematic with noise at the higher frequency/shorter wavelength end of the relevant spectrum. An approach as described with an analogue system which does not have to account for the phase shift as it reduces sound pressure at the or each microphone or sound input device. In embodiments of the invention the phase shift between the microphone and driver or headset is not compensated for directly but is reduced by controlling the distance, or imperfect cancellation is achieved.

In order to mitigate the deterioration in noise cancelling effect experienced when the user U moves their head away from the seat, the system 100 is provided with measuring means 12 as mentioned above.

In one embodiment, the measuring means 12 comprises a camera 17, for example a "webcam" type camera which may be provided as part of a prior art IFE screen 18. The controller 200 (and/or a separate processor) may determine the distance between the head of the user U and the reference point R by calculating the proportion of the camera's field of view which is filled by the user's head. An increase in the proportion of the field of view filled indicates a movement of the head toward the camera, and therefore an increase in the distance between the user's head and the microphone(s) 2.

In another embodiment, the seat 1 may be provided with a proximity sensor, for example an infra-red proximity sensor (not shown) or an ultra-sonic proximity sensor. The sensor may be located at or adjacent the headrest 3 or upper portion of the back of the seat 1. In some embodiments the proximity sensor may be located in the rear surface of the seat in front of the user. In one embodiment the sensor may be integrated into the IFE screen provided at the back of the seat in front of the user.

The processor 201 uses the information from the measuring means 12 to adjust and/or generate the anti-noise signal. In one embodiment the processor uses the information to provide or adjust one or more of the phase, amplitudes or audio spectrum content of the anti-noise signal, to allow for the distance and/or relative position between the microphone and the user's head.

In an embodiment of the invention the head movement is allowed for by the use of multiple microphones. Head movement can produce significant variations in the open loop transfer function, affecting the loop gain and phase shift (group delay). This may be possible by the use of multiple microphones arranged geometrically, or otherwise, around a centre point. Preferably the arrangement or array of microphones has an equal spacing between each of the microphones and a central point; alternatively there may be equal spacing between each of the microphones. Preferably a transducer or driver is positioned substantially at the centre point. That is, multiple microphones are used (for each headphone channel) and variations in the loop transfer function are reduced. One possible embodiment is to use a circular (or forming the points of a polygon) array of microphones. If a driver is associated with the microphones this may be positioned substantially at the centre of the array. For example the speaker may be positioned within the perimeter formed by the microphones. However some variability in this may be workable because as the speaker moves away from the centre, the distance to some microphones increases but the distance to others decreases, compensating for any loss of effect.

Figure 12:
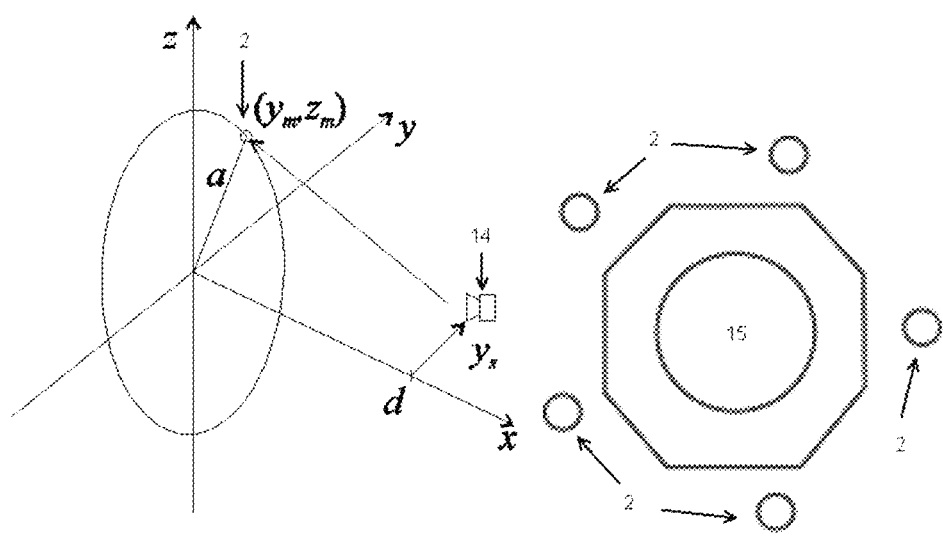
FIG. 12 are schematic and diagrammatic views of an example controller for an active noise control system using a circular array of microphones of the present invention.

FIG. 12*a* shows the transfer function can be calculated from an ideal point source speaker positioned a distance d away from a circular array, and at a distance y off-axis. An average array response can be calculated as $$z = \frac{1}{M}\sum_{m=1}^{M} H_m(f),$$

where H(f) is the transfer function to each microphone. FIG. 12*b* shows a possible arrangement of microphones 2 around the speaker 14.

Figure 13:
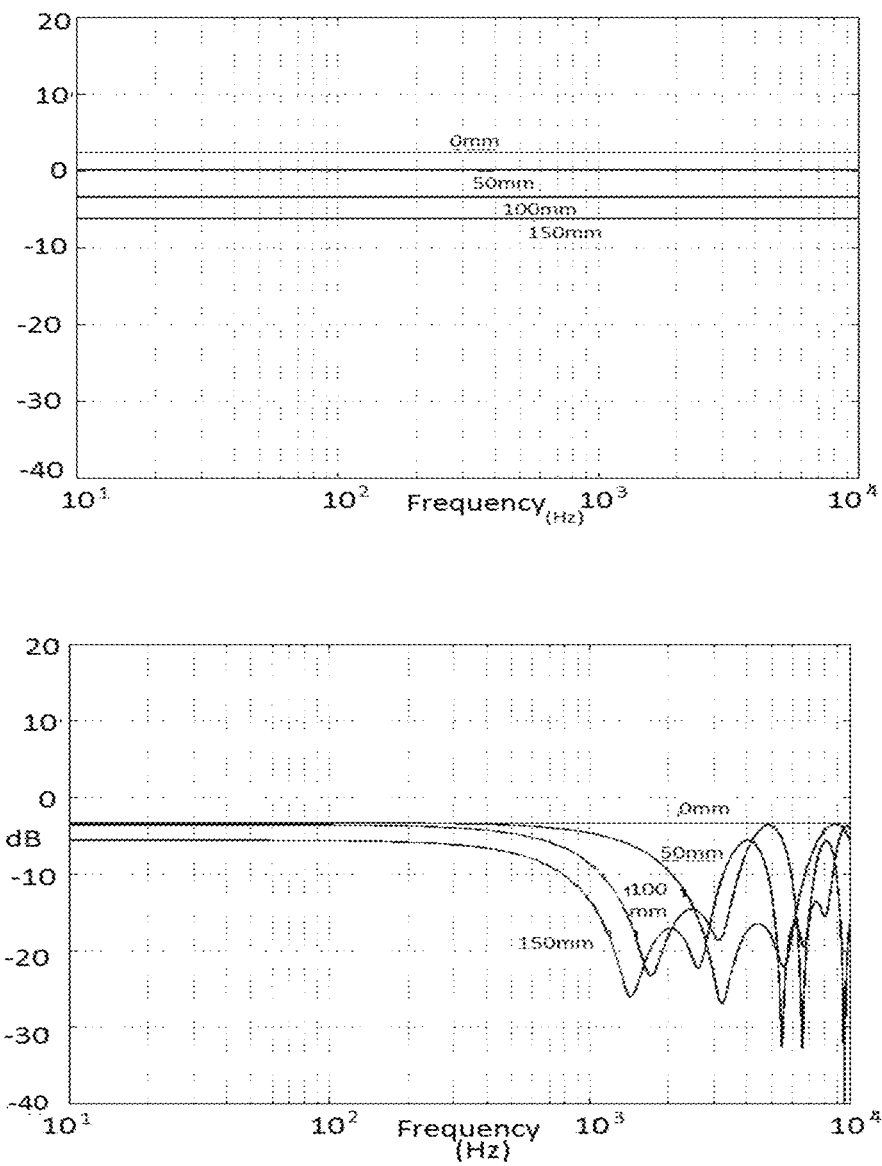
FIG. 13 is a plot view of the loop gain of a controller using (a) a single speaker and (b) a circular array for an active noise control system of the present invention.

The loop gain and group delay for a single microphone, at a distance of 60 mm from the on-axis speaker, are substantially constant across the frequency spectrum FIG. 13*a*. The gain varies with the reciprocal of the speaker to microphone distance d producing a variation of around 8 dB and the corresponding group delay is the propagation delay time, which varies over 0.3 ms. That is there is a measureable change in loop gain and group delay with horizontal head movement. FIG. 13*b* shows the loop gain for a circular array of 5 microphones at a radius of 100 mm, and the same on-axis distance of 60 mm. At low frequencies, the loop gain variation for off-axis distances up to 100 mm is negligible and the gain drops by around 2 dB for the 150 mm off-axis case, where the speaker is outside the microphone array radius. That is there is essentially no variation in loop gain if the speaker remains within the microphone array radius and the system is less susceptible to loss of effect when a user's head moves sideways.

A similar effect occurs in the corresponding group delay with negligible variation at low frequencies when the loudspeaker is off-axis distance but within the microphone array. The average group delay (345 μs) is larger than for the single microphone with no off-axis shift (176 μs), but shows little variation. This means that a stable loop gain can be set which will allow a noise canceller to provide a more consistent level of cancellation.

In one embodiment head/headset position can be measured or estimated using the capacitance. Since a human head has a significantly different dielectric loss from that of air, linear changes in capacitance correlate to head proximity.

The sound pressures at the microphones need to be considered for waves approaching from different directions, for instance angles of incidence 0, 45, 90 and 180 degrees relative to user U. The effect on the approach angle of the noise signal may determine how the noise cancellation should vary along the aircraft or how a system can be adapted to attenuate signals from multiple directions. Different drivers 14 in headphones 14 or speakers 14 can also react differently to a noise signal. For instance an electrodynamic loudspeaker (which may be modelled by including a second order high-pass filter in the feedback loop may have poor noise cancellation at low frequencies. This is because the speakers are unable to radiate significant sound at this frequency.

Figure 8:
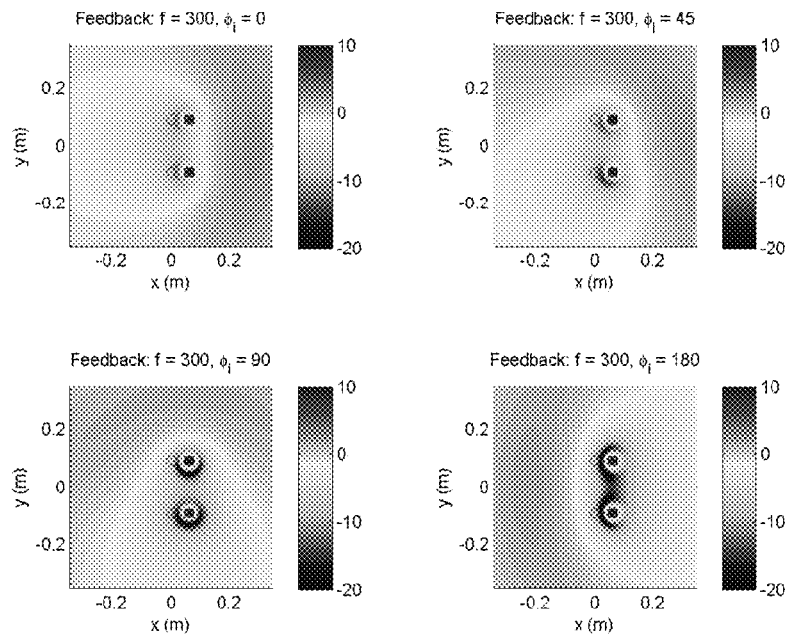
FIG. 8 shows plotted feedback views of the sound levels for impingement angles of (a) 0, (b) 45, (c) 90 and (d) 180 degrees at a distance of 60 mm.

FIG. 8 shows the performance of an ANC system for a 2 microphone, 2 driver system. Looking first at FIG. 8a the feedback field for 0 degrees incidence (i.e. the field travels from the right to the left of the images) shows attenuation of around 10 dB behind the microphones. This occurs because the loudspeakers generate a field propagating along the negative x-axis to cancel the pressure at the microphones, and the cancelling field travels beyond the microphone and continues to cancel the noise at points beyond the microphones also. FIGS. 8b, c and d show the variation in performance as the noise wave is varied, illustrating increased attenuation behind the microphones as the angle of incidence changes. The relative positions of the noise source, the microphones 2 and the drivers 14 may improve performance by creating a desired feedback field based on knowledge of the noise.

Figure 9:
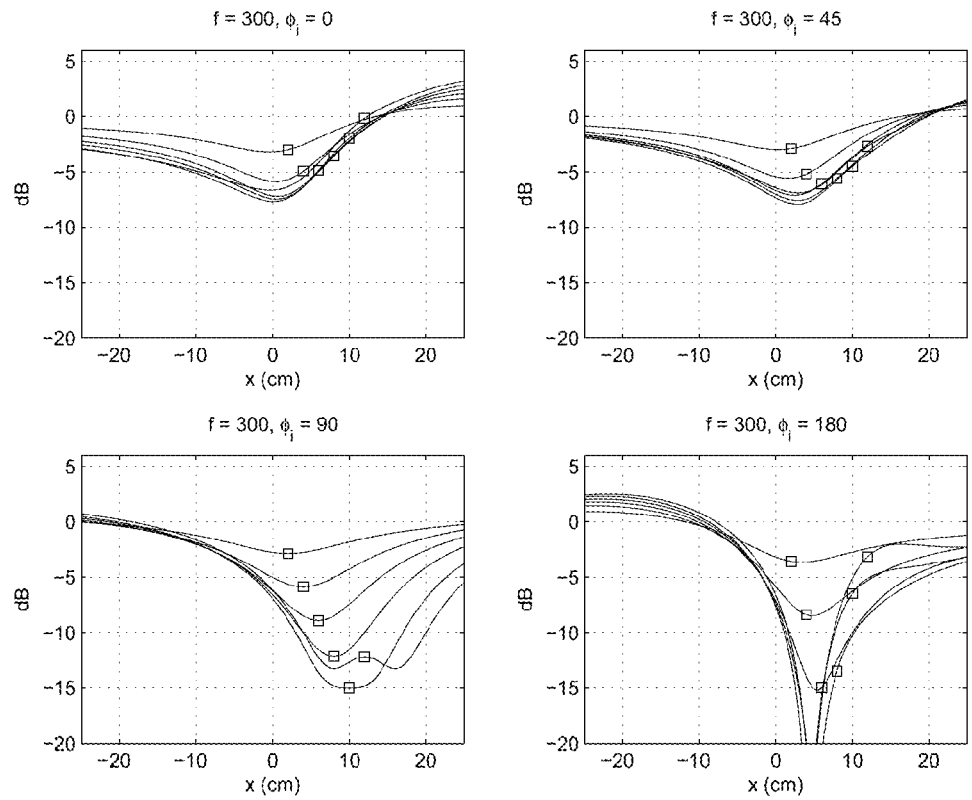
FIG. 9 shows the feedback field along an axis for a 2 channel canceller with speaker to microphone distances of 20 mm to 120 mm for impingement angles of (a) 0, (b) 45, (c) 90 and (d) 180 degrees.

The sound field along the x-axis is shown in FIG. 9 for driver to microphone distances of 20 mm to 120 mm. These reflect the changing positions of a user's head when using the system. The position of the speakers is denoted by a square, which is where the centre of the listener's head would be, in each case the microphone is located at 0 on the x axis. In each case a maximum attenuation is achieved for a microphone to headset distance of between 60 and 100 mm. The effectiveness of the attenuation also depends on the angle at which the noise is arriving. The maximum attenuation at different angles is approximately: 5 dB maximum for 0 degrees incidence, 6 dB for 45 degrees and is 15 dB for 90 and 180 degrees.

A limiting feature for large distances is that the performance degrades because the loop transfer function matrix has large delays and the loop gain must be reduced to maintain stability, reducing the cancellation. That is the delay between the driver changing its output and the output being received by the microphone becomes too large to make an accurate estimate of the noise cancellation required. The controller may have systems to attempt to reduce, or have knowledge about this delay, for instance by obtaining a measurement of the approximate distance of the microphone and the driver and compensating for this. This compensation may be a phase delay or gain control. The compensation may use the direction of the sound, as detected by the multiple microphones, to adjust the signal dependent on the angle of arrival of the ambient noise. This may be implemented by a calibration stage in which a required set-up is measured. A limiting feature for small distances, such as the cancellation for the 0 degrees incidence at 20 mm) is that the spherical divergence of the cancelling field is reduced when the speaker is further away. This allows the cancelling field to appear more planar at the microphone and attenuate the noise more effectively. Similar behaviour is seen for the 180 degree case, where there is greater cancellation for positive x value, which is downstream from the canceller for this incident direction. The speakers or transducer 14 may be placed at a distance d behind the seat back to ensure the minimum distance is met. In use the presence of the head of a user will alter the response behaviour at medium to high frequencies which makes these less relevant to consider.

Figure 10:
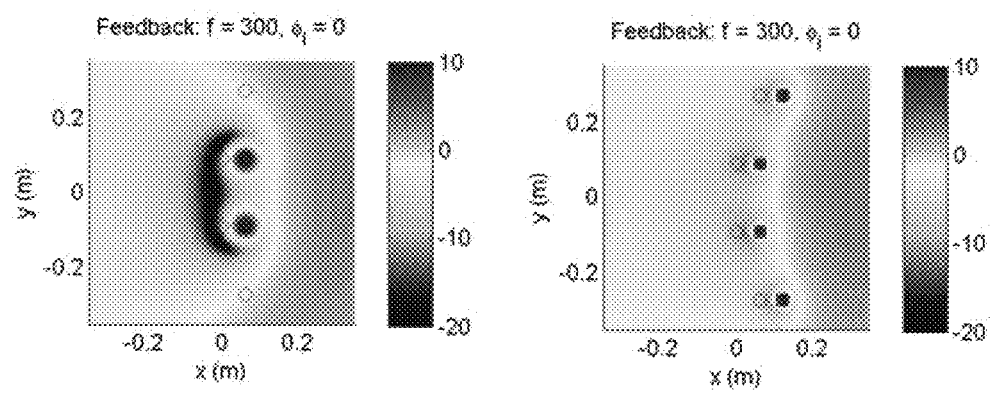
FIG. 10 shows plotted feedback views as in FIG. 8a for (a) 4 microphones 2 drivers and (b) 4 microphones 4 speakers at 60 mm.
Figure 11:
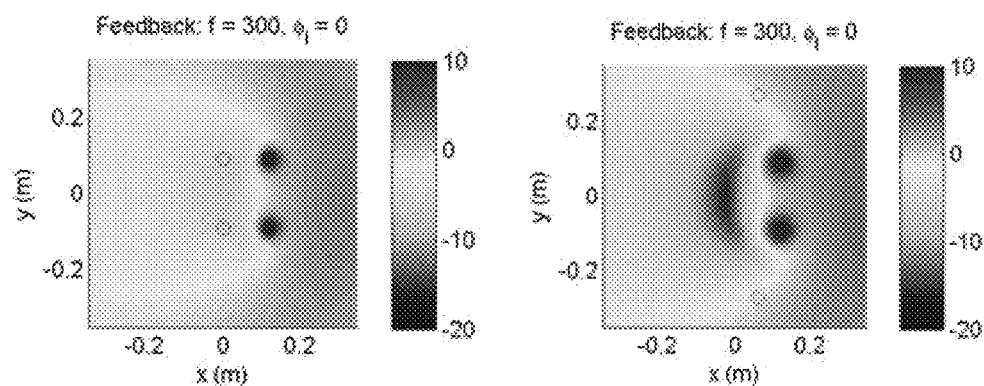
FIG. 11 shows plotted feedback views as in FIG. 8a and FIG. 10 at a distance of 12 mm.
Figure 11:
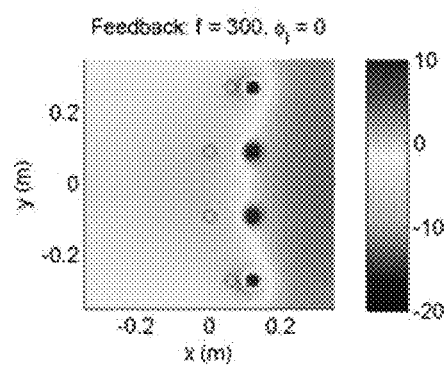

FIG. 10 shoes the effect of transducer 2 and driver 14 arrangements. FIGS. 10a and 10b show the feedback field for the 2S4M and 4S4M arrangements respectively. The area over which cancellation occurs and the intensity of the cancellation near the center microphones is increased by the use of four microphones, and the region of cancellation is slightly increased using four speakers. This means that there may be more opportunity for a user to move their head and maintain a reasonable level of noise cancellation where more speakers are used. This is because the additional speakers contribute to the cancellation of the sound at the microphones and therefore the output of the speakers to obtain noise cancellation can be reduced. The effect of the noise cancellation also changes with distance between the speakers and the microphone as shown in FIG. 11 which shows a separation of 120 mm for systems of 8a, and 10a and 10b. The increased distance requires large microphone amplitudes to cancel the noise. In embodiments of the system, the distance of the head may be measured, and this measurement may help to compensate for the required increase in amplitude.

In some embodiments, the controller 200 may further comprise a further input for receiving information regarding one or more characteristics of the driver(s) 14 and/or headphones 15 which are being used. Such characteristics may comprise information regarding the electrical impedance of the drivers 14, the acoustic impedance of the headphones 15, the frequency response of the drivers, acoustic volume over the ear, or any other characteristic of the headphones and/or drivers which affects properties of the anti-noise signal required and/or the headphone's ability to generate the required anti-noise signal.

In one embodiment, one or more characteristics may be detected electrically and/or electronically. For example, in one embodiment the impedance of the headphone drivers may be detected electronically.

In another embodiment, the headphone plug may have a physical characteristic or configuration which is representative of headphones having one or more characteristics, and the headphone jack may send a signal to the controller 200 depending on the plug configuration or characteristic.

In one embodiment, this may be the shape/type of pins, or a measurement of headset characteristics such as impedance. Passive or active components may be provided in the headset or jack (such as a resistor and/or capacitor) to facilitate identification.

In one embodiment, global settings in the IFE may be varied to allow for different drivers. Furthermore, another party such as a headphone manufacturer/supplier could send updated settings to Airlines for different batches of headphones, or at least different models of headphones.

In another embodiment, a user may calibrate the system 100 to suit the characteristics of the headset 15. For example, the controller 200 may be operatively connected to an IFE touch screen 18 and may display a virtual slider on the screen. In a calibration mode, the user U may be instructed to slide the virtual slider until the perceived noise cancelling effect is maximised. Changing the position of the virtual slider may, for example, affect the phase/delay or the amplitude or audio spectrum content of the anti-noise signal generated by the controller 200.

In an embodiment the system identifies microphone parameters to improve performance. This may be obtained from the impulse responses of the headphones or drivers. For example, low cost headphones typically have peaks at around 100 Hz and by peaks of over 20 dB at 2 and 3 kHz, respectively. Better quality headphones typically have a flatter response, showing a more gradual rise of around 20 dB above 1 kHz and an extended bass response below 100 Hz. The flatter response results in more equal treatment of each frequency. Some headphones have holes on the outside, presumably to allow sound to escape from the rear of the driver diaphragm. This tends to produce a dipole response which is characterised by a reduced exterior sound level, particularly at low frequencies. Therefore it may be useful to cover the holes to reduce the radiation from the rear of the drivers.

The controller 200 may be provided in any one of a number of positions within the aircraft. In one embodiment the controller 200 may be integrated into the IFE screen. In another embodiment the controller may be located within the base of the seat. In a further embodiment the controller 200 may be integrated into a central IFE controller which may for example be present as a crew IFE controller.

A limitation to the attenuation provided by the system is the requirement to ensure stability of the microphone 2 and driver 14 systems. Stability avoids loud sounds reaching the ears of the user. This may be achieved by examining the eigenvalues of the system. The eigenvalue loci should not encircle the point to ensure so the system is stable. The determinant should encircle the origin, to further confirm that the feedback system is stable.

In an embodiment a second or higher-order controllers is used. In other embodiments digital controllers may allow additional inputs to be included from the IFE system or other components. High order controllers can be designed using techniques such as $H_\infty$ optimization and techniques well known in the art of controller design. In some circumstances a low-order controller may be advantageous because it does not require such a stable plant. In the embodiment described instabilities in the plant can be created as head position alters. This can cause instability with high-order controller. Significant variations in the plant with high order controllers will rapidly produce instability.

A higher-order controller may produce good performance if there is robustness to changing plant conditions included. Second-order controllers are commonly used in analogue noise control and are used in applications such as practical cancellers and analogue active headsets. A second order phase lag filter suitable for use in noise cancellation has the normalised transfer function $$X(s) = \frac{\omega_D^2}{\omega_N^2} \frac{s^2 + s\frac{\omega_N}{Q_N} + \omega_N^2}{s^2 + s\frac{\omega_D}{Q_D} + \omega_D^2}$$

For a given plant, the parameters of this equation, together with the overall loop gain, can be optimised to maximise cancellation. However, given the plant is highly variable, it would probably require a digital processing system to track the head position and control the five parameters precisely to produce something approaching optimum performance. This would require digital control of the analogue filter, or the direct implementation of a digital controller, which would introduce additional delay in to the feedback loop. It is more practical to consider a simpler second order controller which has less parameters. A possible alternative is described by the equation:

$$X_Q(s) = \frac{[1 + \alpha A_1(s)]^2}{(1 + \alpha)^2}$$

which has a gain of one at DC and a gain of $\beta_2 = (1-\alpha)^2/(1+\alpha)^2$ at high frequencies. The controller has two parameters which govern its performance. A second order controller may have a faster roll-off and be able to maintain a higher loop gain between 100 Hz and 1 kHz. This means that a higher suppression of noise can be produced in this frequency range.

Figure 14:
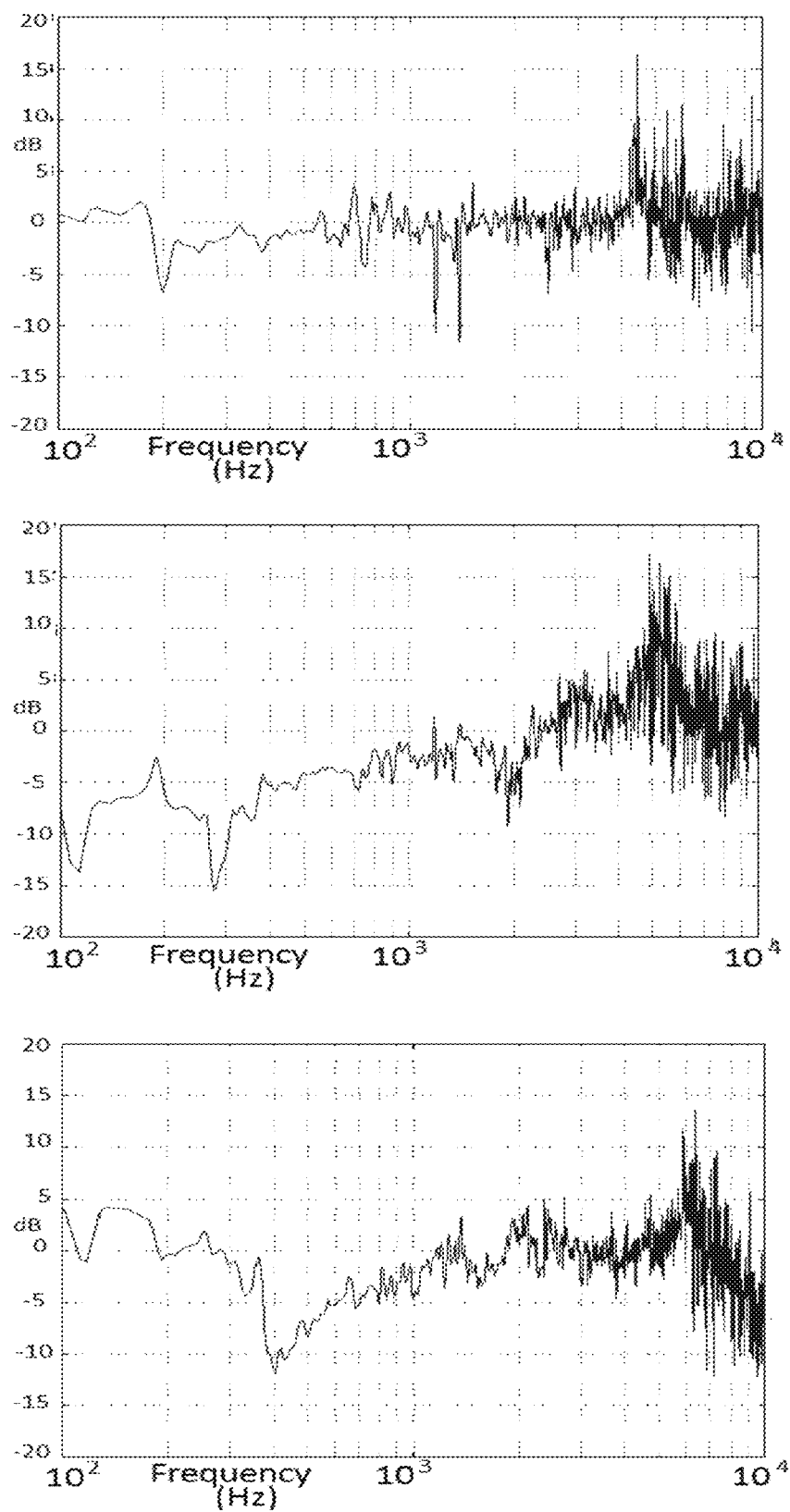
FIG. 14 shows example noise cancellation achieved by a driver from (a) a low cost headphone, (b) a better quality headphone and (c) a loudspeaker in the present invention.

FIG. 14 shows noise cancellation for a variety of headphones and drivers. Noise cancellation is very poor with a null of around 5 dB at 200 Hz and an average cancellation of around 2 dB up to 400 Hz for both covered and uncovered holes for the low cost headphones of FIG. 14*a*. Using better quality headphones increased the cancellation to between 5 and 15 dB for frequencies between 100 and 200 Hz, and the cancellation extends up to 2 kHz as shown in FIG. 14*b*. The performance can be improved because the better quality headphones have larger drivers with greater volume velocities. FIG. 14*c* shows a driver associated with the seat, and preferably the headrest and more preferably the arms of the headrest. This enables the passenger to have noise cancellation with no headphones or for improvement to the noise cancellation of the headphones. For instance a Tymphany P830983 2 inch full range driver could be used.

The microphones may be placed directly in front of, or nearby the driver or in an arrangement around the driver, FIG. 12*b*. The effect of moving the microphones further away from the centre of the driver is to shift the region of cancellation. For instance centralised microphones create a broad region of cancellation from about 200 to 800 Hz, whereas a wider arrangement moves the null to approximately 400 Hz and extending up to 1 kHz. The movement may also increase the depth of the null. The effectiveness of arrangement geometries will depend on the noise spectrum to be cancelled. That is, by moving the microphones further apart a higher frequency of cancellation may be achieved. Increasing the spacing of distance of the microphones also shifts the bandwidth of the cancellation frequencies. As described above the geometry will also affect the ability for the head to move.

The higher quality headphones were more able to provide noise cancellation, although all headphones had reasonable low-frequency responses in the ear canal. It is likely that this occurs because in order to cancel sound at the external microphones, the loudspeakers must be able to produce reasonable low-frequency responses outside the ear canal. This is more likely to be possible using drivers with large volume velocities at low frequencies, which requires larger driver size and excursions. Similarly low-cost microphones may have a low frequency response that rolls off below 200 Hz. This means that the loop controller has to provide greater attenuation at high frequencies to maintain stability. It may be useful to include a low frequency boost to compensate for this roll-off in the processor. That is, if the characteristic of the microphone or speaker is known the processor can ameliorate this, possibly by boosting the low frequency effect in the knowledge that this will not be transmitted as effectively. In embodiments of the invention the low frequency noise, below 300 Hz, may be enhanced because the high frequencies are more strongly filtered and controlled. In some embodiments the invention may include a low-frequency gain control means or controller adapted to attenuate the low frequencies more strongly, or to focus on the attenuation of low frequencies.

In an embodiment of the system the processor or controller may comprise an analogue ANC system comprising four channels, each operating as a stereo pair with a stereo master gain control. Each channel could have an individual second-order loop filter with adjustable cut-off frequency and high-frequency attenuation. Amplification of the signal can be provided by a TDA7266P 3 Watt power amplifier which provides two bridge mode outputs. An output, for example to standard stereo headphones may be achieved by wiring a pair of channels as a single-ended output. It should be noted that an IFE system may be different from the system described, as it may interface with the IFE server. The various system components could be interchanged with other electronic devices or components having the same effect without leaving the scope of the invention. In other embodiments the processor may be a microprocessor, FPGA or logic device capable of being programmed or receiving instructions.

Although a general amplifier has been discussed a person skilled in the art of amplifier design would recognize that a number of amplifiers may be suitable. Amplifiers may be used to reduce undesirable cross talk effects, e.g. by use of separate processor sections or chips. In an embodiment a class D amplifier may be used to reduce power usage. The power rating of the amplifier is related to the sound pressure level that must be cancelled; and so high sound levels may require high power ratings, particularly when using loudspeakers.

The processor or processing means may be associated with, or be part of, the IFE system and the processing may be completed by the IFE system in some embodiments. In embodiments the IFE system may allow connection between microphones and or speakers arranged on the user's seat or other seats or elsewhere on the aircraft. For instance the system may have speakers arranged on the headrest for the seat and a seat behind the seat.

In embodiments of the invention the phase error of the signal or ANC control may be reduced or minimized by ensuring that a minimum of high-pass filters is used in the controller and that their cut-off frequencies are well below 20 Hz. The phase error is likely to be the various high pass filters in the system. A driver typically has a second order high pass response which produces 180 phase shift at low frequencies. The electronic high pass filters and drivers thus introduce significant phase deviations at low frequencies. A further means of minimizing the phase error is to add further high-pass filters; each of which introduces a 90 degree phase shift at low frequencies. Using the right number of additional filters should ensure that the combined effect of the driver and high pass filters is to maintain a desired phase (e.g. 180 degree loop phase). That is the number of filters, and phase change of the filters, alone, or including other effects, may be sufficiently close to 180 degree loop phase.

People skilled in the art will appreciate that the apparatus or features described may be associated with the IFE system in various ways. The association may be by spatial closeness, or connection or connectability, attachment or the ability to be removably attached to the system.

Those skilled in the art will appreciate that the present invention provides a system and method for providing a user with the benefits of active noise cancellation which can be used with inexpensive passive headphones. The invention has been described using an analogue control scheme. A person skilled in the art will appreciate that a similar scheme could be modified for a digital controller implementation.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth. 'Headset' herein includes an earphone or in-ear device.

Although this invention has been described by way of example and with reference to possible embodiments thereof, it is to be understood that modifications or improvements may be made thereto without departing from the spirit or scope of the invention.

What we claim is:

1. An active noise cancellation system for an aircraft In-flight entertainment (IFE) system, the active noise cancellation system comprising:
   At least one transducer, on or in a seat on the aircraft, to receive an input representative of an ambient noise at the transducer input;
   At least one driver, the driver located on, or part of, a headset and adapted to transmit an output signal to a user;
   An output for transmitting an output signal to the driver, and
   A processor adapted to process the input to produce an anti-noise signal adapted to reduce the ambient noise at the at least one driver location, the processor further adapted to produce the output signal by superimposing the anti-noise signal and a signal received from the IFE system.

2. A system as claimed in claim 1 comprising a measurement device for determining the distance between at least one of each of the at least one driver and at the at least one transducer, wherein the processor is adapted to adjust the anti-noise signal dependent on an input from the measurement device.

3. A system as claimed in claim 1 wherein at least one transducer is attached or attachable to an arm of a seat headrest, and wherein the angle of the transducer is acute with respect to a user of the seat.

4. A system as claimed in claim 1 comprising a plurality of transducers on or in a surface of the seat, the transducers spatially separated in a substantially planar arrangement on or in the surface of the seat.

5. A system as claimed in claim 4 wherein the plurality of transducers are spaced around a driver, the driver in or on the seat.

6. A system as claimed in claim 4 wherein the plurality of transducers are equally spaced on the vertices in a polygon.

7. A system as claimed in claim 1 wherein the output comprises a jack adapted to form a connected with a plug electrically connected to the at least one driver.

8. A system as claimed in claim 1 wherein the transducer is a microphone or the driver is a speaker.

9. A system as claimed in claim 1 comprising an aircraft seat.

10. A system as claimed in claim 1 wherein the system has a plurality of transducers and a plurality of drivers arranged in multiple channels.

11. A system as claimed in claim 10 wherein the multiple channels are combined and/or connected.

12. A system as claimed in claim 1 wherein the processor comprises an input adapted to receive information regarding one or more characteristics of the at least one driver.

13. A method of active noise cancellation in an In-Flight Entertainment (IFE) system, the method comprising the steps of:
   Receiving an input from an transducer on or in a seat on the aircraft;
   Processing the input to produce an anti-noise signal adapted to reduce the ambient noise at a driver location;
   Receiving a signal from the IFE system;

Superimposing the anti-noise signal and the signal from the IFE system;

Outputting the superimposed signal to at least one driver located on, or part of, a headset, the driver adapted to transmit the superimposed signal to a user.

14. A method as claimed in claim 13 further comprising the step of adjusting the output signal as the distance between the user and the transducer changes.

15. An seat attachment for an active noise cancellation system, the seat attachment comprising:

A transducer for receiving an input representative of an ambient noise at the transducer input;

A driver adapted to transmit an output signal adapted to reduce the ambient noise in an area associated with a headset associated with the seat attachment; and Wherein, in use, a processor receives the input from the input device and processes the input to produce the output signal, the output signal adapted to reduce the ambient noise at the associated headset, the processor further adapted to produce the output signal by superimposing the anti-noise signal and a signal received from the IFE system.

16. A seat attachment as claimed in claim 15 wherein the seat attachment is a part of, attached to or attachable to a seat.

17. A seat comprising a seat attachment as claimed in claim 15.

18. A seat attachment as claimed in claim 15 comprising a plurality of input devices surrounding or encircling a driver.

19. A seat attachment as claimed in claim 15 comprising a connection to an IFE system, wherein the output signal can be transmitted to an output of the IFE system.

* * * * *